United States Patent [19]

Zannini et al.

[11] Patent Number: 4,742,994

[45] Date of Patent: May 10, 1988

[54] POWERED VEHICLE FOR OPERATION OF LADLES, IN PARTICULAR FOR TAPPING ALUMINIUM

[75] Inventors: Gianfranco Zannini; Pierandrea Nalesso, both of Limena, Italy

[73] Assignee: Techmo Car S.p.A., Limena, Italy

[21] Appl. No.: 905,587

[22] PCT Filed: May 18, 1985

[86] PCT No.: PCT/EP85/00237

§ 371 Date: Jul. 21, 1986

§ 102(e) Date: Jul. 21, 1986

[87] PCT Pub. No.: WO86/04839

PCT Pub. Date: Aug. 28, 1986

[30] Foreign Application Priority Data

Feb. 21, 1985 [IT] Italy .................................. 19602 A/85

[51] Int. Cl.$^4$ ................................................ C21B 3/10
[52] U.S. Cl. .................................... 266/165; 266/276; 414/459
[58] Field of Search .......................... 266/165, 276, 287; 180/199, 200, 201, 202; 414/373, 389, 391, 467, 459

[56] References Cited

U.S. PATENT DOCUMENTS

| 2,638,995 | 5/1953 | Gottlieb | 180/199 |
|---|---|---|---|
| 3,567,204 | 3/1971 | Ando et al. | 266/165 |
| 3,567,206 | 3/1971 | Heggstad et al. | 266/165 |
| 3,623,562 | 1/1970 | Pitra | 180/200 |
| 3,718,265 | 2/1973 | Trost | 266/165 |
| 3,897,881 | 8/1975 | Brock | 414/459 |
| 3,994,481 | 11/1976 | Torvund et al. | 266/276 |
| 4,170,434 | 10/1979 | Kress et al. | 414/459 |
| 4,195,822 | 4/1980 | Grochowski | 266/276 |
| 4,500,248 | 2/1985 | Kramer | 414/459 |

FOREIGN PATENT DOCUMENTS 1583473 8/1970 Fed. Rep. of Germany .
0329241 6/1972 U.S.S.R. .

Primary Examiner—L. Dewayne Rutledge
Assistant Examiner—S. Kastler
Attorney, Agent, or Firm—Collard, Roe & Galgano

[57] ABSTRACT

A powered vehicle for operating ladles and the like, in particular ladles utilized for tapping molten aluminium, which vehicle comprises an arcuate load-bearing structure substantially of the rigid bridge girder type resting securely on two opposedly located trucks associated with the bottoms and exteriors of the bridge girder end uprights, one of said trucks carrying a motor means and respective drive to at least one of the trucks, and the other carrying a fitted driver cab for an operator, associated with said bridge girder there being an additional bridge girder structure mounted for a vertical sliding movement along guides formed on the uprights of said bridge girder by hydraulic cylinders or the like, with whose opposite uprights there are associated, at opposite locations, projecting elements of cradle- or fork-like configuration, or the like, adapted to receive, support, and hold studs or pins standing proud of a ladle surface, at diametrically opposed locations thereon, whereby the ladle can be hooked up, gripped and lifted for transportation, at the top of said sliding bridge girder there being provided a hook-up means set rotatable about a vertical axis and effective to support and rotate the ladle lid, with said trucks there also being associated auxiliary wheel pairs having their axes at right angles to the truck wheels and being power driven, which auxiliary wheels can be raised and lowered by means of hydraulic cylinders or the like, or suitable devices operative to simultaneously pivot the truck wheels through 90°.

4 Claims, 2 Drawing Sheets

POWERED VEHICLE FOR OPERATION OF LADLES, IN PARTICULAR FOR TAPPING ALUMINIUM

TECHNICAL FIELD

This invention relates to a powered vehicle adapted for total operation, including filling, of ladles and the like, in particular of those utilised in tapping molten aluminium and metal alloys in general, in safe conditions and in a quick and economical way.

BACKGROUND ART

As is known, tapping molten metal from the electrolysis potlines or furnaces of primary aluminium, or from the smelting furnaces of special metal alloys, involves highly critical operations especially in respect of safety and operating economy. In fact, particularly for tapping aluminium from electrolysis furnaces, steel crucibles are used which are lined internally with refractory and provided with a sealing lid, and commonly referred to as ladles. Disposed on the ladle lid is a shaped tube which is dipped into the molten metal contained in the electrolysis cells, thereby on applying a vacuum to the ladle by means of compressed air evacuator, or some other arrangement, connected to an opening in the lid, the molten aluminium is caused to flow up into the ladle through said shaped tube. It follows that, when tapping is required, the ladle must be moved close to the furnace, and after filling, be moved away and transported to the collecting furnaces grouped in the foundry area. Since the smelting furnaces are usually laid, in the potline room, in parallel lines, either as rows or arrays of furnaces, leaving between rows or arrays access passages which are allowed to be fairly narrow for space saving reasons, the ladle handling operations become complicated, unpractical, and even hazardous for the operators.

To move a ladle close to the casting furnace and take it to the foundry, it is current practice to use bridge cranes running parallel to the cell rows, or alternatively, self-propelled fork, crane, or the like trucks.

In actual practice, both the use of bridge cranes and self-propelled crane or fork trucks involves serious problems and limitations to their operation, additionally to the fact that at least two operators are required in such cases.

In fact, a bridge crane only allows for transportation of the ladles along a straight path over the potline, and consequently, all the movements of the ladles to and from the molten metal collecting furnace at the foundry must be effected using fork or crane vehicles. Transportation with fork or crane vehicles is a difficult and hazardous operation on account of the movements which take place in the molten mass within the ladle during transportation and of the location of the ladle which, being usually placed in front of the vehicle operator, is apt to restrict his visibility and hinder the moving operations.

Lastly, both the bridge cranes and the fork or crane trucks, additionally to being unwieldy and generally inconvenient to use in the passages between rows of smelting furnaces, involves the availability of complex and expensive permanent installations.

DISCLOSURE OF THE INVENTION

It is, accordingly, an object of this invention to provide a powered vehicle for total operation of ladles and the like, that is for taking ladles to the tapping location close to smelting furnaces, picking them up on the vehicle, removing and then transporting them to the foundry, which vehicles can replace the bridge cranes and self-propelled fork and crane vehicles currently in use, while providing safe, convenient, and fast operation features.

Another object of the invention is to provide a powered vehicle, particularly but not solely suitable for the handling of ladles having a tight sealing lid and a shaped tapping tube, as employing for tapping molten aluminium, which enables all of the tapping and ladle transferrment operations to be performed with the use of a single operator and in conditions of utmost stability of the ladle and full visibility for the driver.

It is a further object of this invention to provide a powered vehicle as indicated, which is so structured as to be compact, and hence suitable for operation in the passages provided in the usual potlines, highly practical to drive and from sideways to its normal travel direction, and allows for a reduced bulkiness of the ladle by virtue of a more compact size shaped tapping tube, and which affords improved accommodations and comfort for the operator.

These and other objects, such as will become apparent in the ensuing description, are achieved by a powered vehicle for total operation of ladles and the like, in particular ladles equipped with a sealing lid and tapping tube as utilised for tapping molten aluminum, which vehicle comprises, according to the invention, an arcuate, substantially bridge-like load-bearing structure rigidly secured on two opposed trucks associated with the bottoms and exteriors of the rigid bridge, one of said trucks carrying a motor means and respective drive system for transmitting motion to at least one truck, and the other of said trucks carrying an equipped driver cab for the operator, associated with said rigid bridge being an additional bridge structure which is slidable vertically along guides formed on the uprights of said rigid bridge by hydraulic cylinders or the like, with the opposite uprights of which there are associated, at opposed locations, cradle-or fork-like protruding elements, or the like, adapted to receive, support, and hold securely studs or pins protruding from a ladle, at diametrically opposed locations thereon, thereby allowing said ladle to be pickup up and stably held inwards of the uprights of said bridges and lifted for transportation, at the top of said sliding bridge there being provided a centrally located hook-up means, set pivotally about a vertical axis and adapted to support and rotate the ladle lid, whether having the same diameter as or a smaller diameter than the ladle, and with said trucks there being associated auxiliary wheel pairs whose axes are at right angles to that of the truck wheels and at least in part powered and adapted to be raised and lowered by hydraulic cylinders or the like, or alternatively, suitable devices being associated therewith to simultaneously pivot through 90° the wheels of said trucks to enable the vehicle to move sideways for picking up the ladle and position the ladle close to the casting furnaces and/or collecting furnaces for the metal.

More specifically, said means of hooking up and supporting the ladle lid comprises a pin rotatable about a vertical axis lying in the plane of the sliding bridge, to the bottom end whereof a lid having the same diameter as the ladle is hingedly connected in a permanent fashion; to provide pivotal support for a lid having a smaller diameter than the ladle, a linkage is provided, according to the invention, which includes essentially an articulated parallelogram system of levers, mounted to the sliding bridge to overhang therefrom and being actuatable through a hydraulic cylinder or the like, at the end whereof a rotating vertical pin is provided having permanently secured to its bottom end the ladle lid and respective tapping tube.

Furthermore, according to the invention, an automatic weighing device of a hydraulic or pneumatic or electric type is associated with said sliding bridge, which provides continuous readout of the level, and hence the amount, of the tapped molten metal into the ladle.

BRIEF DESCRIPTION OF DRAWINGS

A presently preferred, but not exclusive, embodiment of the invention will be described herein below in more detail with reference to the accompanying drawing sheets, given herein by way of illustration and not of limitation, where.

BEST MODE FOR CARRYING OUT THE INVENTION

Figure 1:
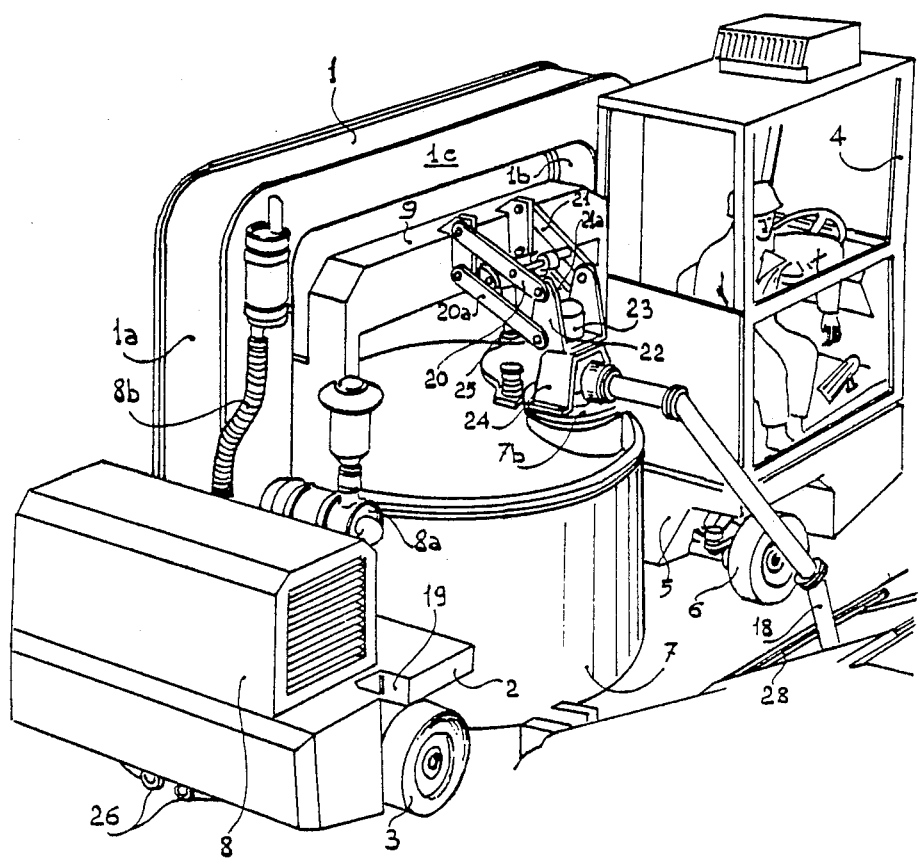
FIG. 1 is a perspective view of a powered vehicle for ladle handling, according to the invention, shown in its condition with a ladle hooked up and the tapping tube introduced into an electrolytic cell for aluminium.

With reference to the drawing figures, a powered vehicle according to the invention comprises a rigid load-bearing structure 1, of the box-type or the like, which has an arcuate, substantially bridge-like configuration with opposed vertical uprights 1a and 1b, extending parallel to each other. Mounted to the bottom or base of the upright 1a is a truck 2 having two wheels 3, in which the axis of the wheels 3 extends perpendicularly to the vertical plane which contains the rigid bridge 1. Associated with the bottom or base of the upright 1b, is a driver cab 4 for the operator, which is equipped with a revolving seat, steering wheel, and any other standard controls required to operate the vehicle and the handling and tapping devices (lifting and pivoting the lid, pivoting the tapping tube, moving the ladle, etc.). The driver cab is also mounted on a truck 5 having wheels 6 in turn mounted for rotation about a parallel axis to that of the opposed wheels 3. Both trucks, 2 and 5, are disposed laterally of the vertical plane of the rigid bridge 1, to allow for accommodation of a ladle 7 within the bridge at a centered middle position relatively to the four wheels 3 and 6 of the trucks; this in order to ensure stability of the ladle filled with molten metal during the lifting and transportation phases, as explained hereinafter.

The truck 2 mounts a motor means (not shown), which is shielded off by a suitable case or hood 8, and the appropriate drive for transmitting motion to at least one wheel pair, preferably the wheels 3, as well as for actuating the hydraulic cylinder/piston assemblies provided in association with the fixed bridge, the function and positioning whereof will be detailed hereinafter.

Indicated at 8a and 8b in the drawings are an intake air filter and gas exhaust conduit, respectively; the type of motor means which has shown to be the most suitable is an internal combustion engine.

Figure 2:
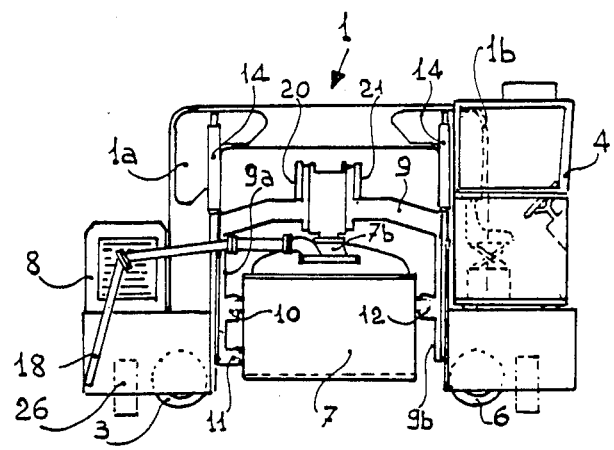
FIG. 2 is a side view of the vehicle of FIG. 1, with the ladle raised and tapping tube pivoted against the vehicle to reduce its lateral bulkiness.
Figure 3:
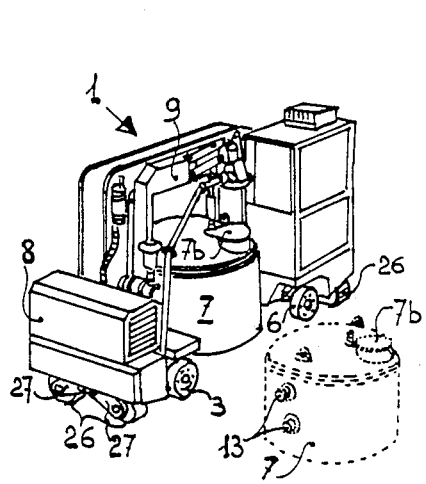
FIG. 3 shows the same vehicle as in FIG. 1, during the ladle approachng phase to the electrolysis cell.
Figure 4:
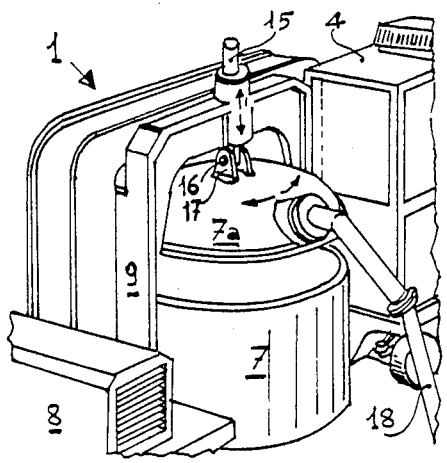
FIG. 4 is a fragmentary view of the same vehicle of the preceding figures, with the lid raised off the ladle.

With the rigid bridge 1 there is associated a moving structure 9, also of bridge-like configuration, which is mounted to slide vertically in contact with the inward face 1c of the rigid bridge by means of guides formed on the opposed uprights of the fixed bridge. As shown best in FIG. 2, the confronting inward surfaces of the uprights 9a–9b of the sliding bridge 9 have respectively attached thereto a shelf or cradle element 10, and at an underlying position, two pins 11 laid side-by-side to form a fork or yoke, and on the upright 9b, a cradle 12. Either uprights may accommodate both the cradle 10, or 12, and the pair of side-by-side pins or the like devices. The cradles 10–12 have the function of receiving and holding securely the pins 13 which protrude at diametrically opposed positions from a ladle 7 (FIGS. 3–4), whilst the two side-by-side pins 11 have the function of keeping the longitudinal mid-axis of the ladle vertical in parallel relationship with the uprights of the sliding bridge 9, so as to prevent swinging movements of the ladle in manoeuvering toward the furnace and in lifting, lowering, and transporting it to the foundry. The sliding bridge 9 is actuatable through hydraulic cylinder/piston assemblies 14 having the cylinders attached to the fixed bridge and the piston rods attached to the sliding bridge, said assemblies being operated by the above-cited engine.

Two devices for hooking up and supporting the ladle lid may be mounted to the sliding bridge. Where the diameter of the lid 7a is equal to that of the ladle mouth (FIG. 4), the supporting device would consist of a pin or trunnion 15 mounted for rotation about a vertical axis (as driven by a motor means controlled from the cab, or some other means) and secured at the bottom by journalling it as at 16 between two ears 17 fast with the lid center. With this arrangement, the lid can be raised—e.g. with the ladle laid on the ground—by raising the sliding bridge, and rotated through 90° to bring the tapping tube 18, still fast with the lid, from the tapping position (FIG. 1) to a rotated position out of its transverse reach, into a recess 19 formed at the top of the truck 2, as shown in FIG. 1.

By contrast, where the lid 7b (FIGS. 1 to 3) has a smaller diameter dimension than the ladle and is offset, said hooking up device would consist of a linkage arranged as an articulated parallelogram, and specifically two pairs of levers 20,20a and 21, 21a (FIG. 1) which are parallel to one another and journalled to the sliding bridge, and carry at the other ends a U-like bracket 22 which has a vertical pin 23 mounted rotatably therein. Associated with the bottom end of the pin 23 is the lid 7b, through an inverted "U" bracket 24. On actuating the articulated parallelogram through the hydraulic cylinder 25, again controlled from the cab, the lid 7b can be raised and lowered, whilst on turning the pin 23, the lid can be rotated through about 90° and the tube 18 moved into a position out of its lateral reach, as in the former instance.

Furthermore, to enable the vehicle to move sideways to its travel direction for transporting, for example to bring it to a ladle picking position or close to the furnaces without any complicated and repeated manoeuvering, the two trucks 2 and 5 are provided with two independent auxiliary wheels 26 (FIGS. 2 and 3), having their axes at right angles to the axes of the wheels 3,6 of the trucks, and being secured cantilever-fashion on two rocker arm levers 27; by means of two hydraulic cylinders, not shown, the levers 27 are spread out or moved close to each other to respectively lower the auxiliary wheels below the level of the truck wheels, or retract them within the truck, thus permitting, when moved out, shifting of the vehicle in a transverse direction to its longitudinal axis, with or without the ladle on. At least one pair of said auxiliary wheels are drive wheels) powered by hydraulic motors controlled from the cab) to enable the ladle to be moved to and from the casting furnace. Said auxiliary wheels may contribute, moreover, to lifting the loaded ladle as the sliding bridge is raised, thus bringing about the advantage of a better distribution of the lifting loads.

The vehicle described in the foregoing is then completed by a device for continuously weighing the metal collected in the ladle, which device may be of a hydraulic, or pneumatic, or electric type, so as to enable the operator to read the amount of the molten metal present in the ladle on a continuous basis.

The driver cab, moreover, would be equipped with an air-conditioning system, filters, and an appropriate thermal and sound insulation, to make the operator's time within the cab more comfortable.

Thus, the vehicle allows the effectuation, from the driver cab, of all the tapping and ladle transportation operations to the foundary area, with the use of a single operator, in conditions of the utmost saftey and ease. In fact, the tapping steps take place, with the vehicle of this invention, practically as follows: the vehicle is driven close to the empty ladle and stopped on the ladle locating itself aligned with the space between the vehicle bridges; then, the auxiliary wheels are lowered and the vehicle is driven to overlie the ladle, thereafter the sliding bridge is raised until the ladle trunnions fit in the cradles 10,12 and between the pins or trunnions 11 brought together. The sliding bridge will then lift the empty ladle (with the tube turned out of the way), and the vehicle be moved close to the casting furnace. The lid is then pivoted to cover the ladle, the vehicle again shifted sideways, thereby the ladle is brought into the tapping position, with the tube ready to be introduced into the furnace 28, as shown in FIG. 1. The compressed air line (e.g. from a centralised system) is connected to the tapping tube provided on the lid, and air is introduced into the same to prevent the molten metal from blocking the tube as the latter is introduced into the furnace, and the tube is dipped to reach the molten metal within the furnace. The compressed air is then redirected to the ejector associated with the lid, as mentioned above, to apply a vacuum to the ladle interior and cause the metal to flow up from the furnace through the tapping tube. Once a preset level of the metal in the ladle is read on the automatic weighing device, tapping is discontinued and the vehicle, with the ladle already hooked to the lifting bridge, can take the ladle to other furnaces (e.g. to fill the ladle completely) and then to the foundry area, after the tube has been turned sideways in. After releasing the ladle in the foundry area, the vehicle is again driven to move and fill another ladle.

Of course, the invention just described in relation to a preferred embodiment thereof, may be variously modified and altered in actual practice to provide equivalent structures: thus, as an example, instead of using four auxiliary drive wheels, it would be possible to employ casters, and a source of compressed air could be mounted on a truck of the vehicle to make the vehicle fully independent.

We claim:

1. In a powered vehicle adapted for handling ladles for molten metals, molten aluminum and metal alloys, consisting of two opposing trucks linked to each other by a rigid structure for the retaining and transportation of ladles with turnable tapping tube for tapping the molten metal, or crucibles, said structure supporting a ladle lid for said ladles, one of said trucks having motor means and the other a driver's cab, and devices effective to permit sideways movements of the vehicle, the improvement comprising:

a first arcuate main bridge structure positioned in the upper part of the vehicle forming said rigid structure so as to leave the lower part of the vehicle completely free from any bottom structure or connecting frames;

a second arcuate bridge structure vertically slidable along guides formed in the uprights of said main bridge structure by means of hydraulic cylinders;

protruding elements disposed on the opposite uprights of said additional bridge structure at opposed locations, said protruding elements being adapted to receive, support and securely hold pins protruding from a ladle at diametrically opposed locations thereon, thereby allowing said ladle to be picked up and held with stability inwardly of the uprights of said bridge structure and lifted for transportation;

hook-up means linked at the top of said sliding second bridge structure set pivotally about a vertical axis and adapted to support for rotation the ladle lid with tapping tube.

2. The vehicle according to claim 1, wherein said hook-up, support and rotation means comprise an articulated parallelogram linkage suitable to position said lid, said linkage being mounted in cantilever fashion onto the top of said sliding second bridge, and a vertical rotatable pin being provided at the free end of said linkage, having said lid fashioned to the bottom end thereof.

3. The vehicle according to claim 1, wherein said tapping tube is permanently secured to said pivoting lid and is turnable to a position parallel to said two bridges so as to be received in a corresponding recess therefor.

4. The vehicle according to claim 1, wherein said main bridge structure and said slidable bridge are positioned laterally to said opposing trucks so that the ladle, when hooked-up, can be maintained stably centered with respect to the travel wheels of the trucks.

* * * * *